May 19, 1925. 1,538,798

G. L. GRIER

DENTAL INJECTION TUBE

Filed June 23, 1921

Inventor
Garrett L. Grier
By
Attorney

Patented May 19, 1925.

1,538,798

UNITED STATES PATENT OFFICE.

GARRETT LAYTON GRIER, OF MILFORD, DELAWARE, ASSIGNOR TO THE L. D. CAULK COMPANY, OF MILFORD, DELAWARE, A CORPORATION OF DELAWARE.

DENTAL-INJECTION TUBE.

Application filed June 23, 1921. Serial No. 479,829.

*To all whom it may concern:*

Be it known that I, GARRETT L. GRIER, a citizen of the United States, residing at Milford, in the county of Kent and State of Delaware, have invented new and useful Improvements in Dental-Injection Tubes, of which the following is a specification.

The present invention relates to improvements in dental injection tubes, and the primary object of the invention is to provide a novel and improved tube adapted for use in the injection of medicaments into the root sockets of the teeth of patients suffering from pyorrhea or similar infected conditions, the tube, according to the present invention, being collapsible so that pressure upon its opposite sides will force the medicament from the body thereof through a reduced nipple and into the root socket, the opposite open end of the body of the tube being widened or flared outwardly, to provide relatively broad surfaces which will facilitate gripping and will insure correct holding of the body of the tube between the thumb and finger and will prevent slipping of the tube from between the thumb and finger when compressed to eject its contents. Preferably, the discharge end of the reduced nipple is flattened on one diameter to facilitate the insertion thereof into the root socket with minimum discomfort to the patient, and the opposite widened or flared portion of the body of the tube is preferably flattened on the same diameter on which the discharge end of the nipple is flattened, in order that the widened portion of the body will correspond with the plane occupied by the flattened discharge end of the nipple, and thus facilitate the correct insertion of the flattened end of the nipple into the root socket, flattening of the flared end of the body of the tube preventing rotation of the tube on its longitudinal axis, during manipulation of the tube to eject the medicament into the root socket and affording other advantages in the use of tubes of this kind.

In the accompanying drawing which illustrates the preferred embodiment of the invention—

Figure 4:
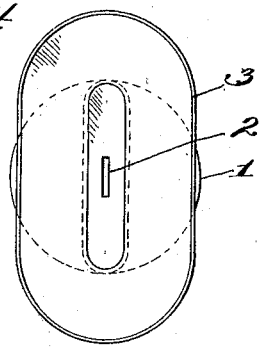
Figure 4 is an end view of the upper flared end of the body portion of the tube.
Figure 1:
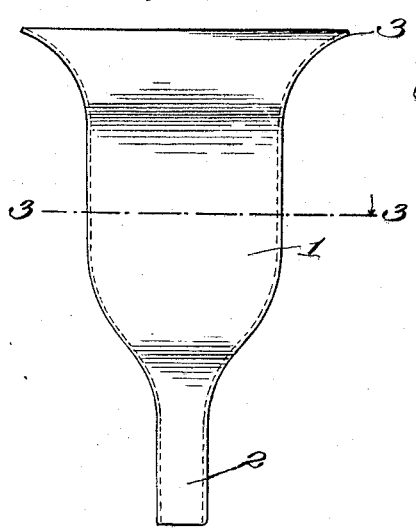
Figure 1 is a side view of the tube.
Figure 2:
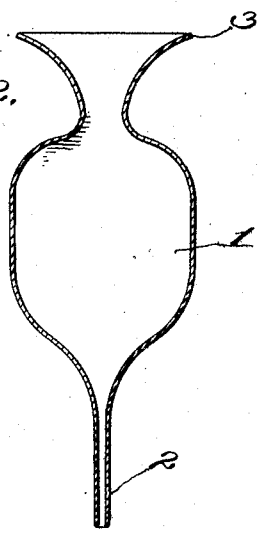
Figure 2 is a vertical sectional view at right angles to Figure 1.
Figure 3:
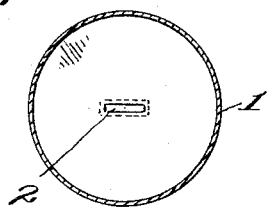
Figure 3 represents a cross section through the body of the tube, on the line 3—3 of Figure 1.
Figure 5:
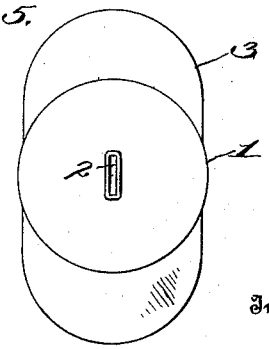
Figure 5 is an end view of the lower discharge end of the nipple.

The tube is composed of a suitable non-metallic collapsible and insoluble substance, transparent celluloid being especially suited for the purpose. It comprises a body portion 1 to contain a supply of the medicament, this body portion being preferably circular or substantially so in cross section, the body portion being normally open at one end and provided at its opposite end with a reduced neck or nipple 2, the lower end of which is open for the discharge of the medicament therethrough. This lower discharge end of the nipple is preferably flattened, as shown in Figure 5, so that it presents a very narrow cross section on one diameter which enables this end of the nipple to be easily introduced between the root of a tooth and the wall of its socket with minimum distention of the wall of the socket, and hence with minimum irritation to the inflamed or sensitive tissues of the gum. The opposite or upper portion of the tube is flared or otherwise expanded in cross section, to form a mouth which has a width or diameter substantially greater than that of the body portion 1, and this flared or expanded mouth preferably has an out-turned or projecting lip 3. This expanded or flared mouth 3 is also preferably flattened on the same diameter of the tube on which the discharge end of the nipple is flattened, so that the flattened discharge end of the nipple and the flattened expanded portion will lie in substantially the same plane. By so constructing the tube, the flattened portion of the mouth where it joins the body forms a normally open constriction and the expanded and flattened end of the mouth of the tube can be easily and effectively held between the thumb and finger, and this flattened expanded portion acting as a guide will enable the flattened discharge end of the nipple to be inserted into the root socket with a flat side of the nipple lying against the root. Pressure may then be applied by the thumb and finger, first to the flattened and expanded portion 3 of the mouth which will serve to collapse the constriction between the body and the mouth and thus close and seal this end of the tube against escape of the medicament contained in the body portion 1 thereof, following which the compression may be extended to the medicament-containing body portion 1, in consequence of which the medicament or a portion thereof will be squeezed out of the body portion of the tube, through the nipple 2 and into the root socket. The widened thumb and finger gripping portion of the tube enables the tube to be gripped so securely as to prevent endwise or other displacement of the tube between the thumb and finger, during the squeezing operation, and hence the treatment can be effected with facility and with minimum discomfort to the patient.

The tube is preferably composed of celluloid as it is insoluble and non-absorptive to moisture, so that any medicament which the treatment requires may be used and the tubes will possess substantially constant physical properties, whether they be moist or dry. Celluloid also possesses the requisite degree of pliability or resilience to enable it to be compressed or collapsed to squeeze the medicament therefrom, and moreover, the discharge end of the nipple will yield and accommodate itself more or less to the space between the root and the root socket into which it is introduced, thus enabling it to be inserted until it reaches any pockets that may be formed in the root, without serious discomfort to the patient. By flaring the upper end of the body of the tube, rolling of the tube on a table or other flattened surface on which it may be placed is minimized or prevented, this being especially so when this flared end of the tube is flattened, and hence tubes of this construction can be handled conveniently by dentists.

I claim as my invention:—

1. A dental injection tube comprising a collapsible body to contain a fluid substance, and a reduced nipple at one end thereof provided with a discharge opening, the opposite end of the body having a normally open outwardly flared mouth of a diameter greater than that of the body and a constriction between its flared mouth and the body which is adapted to be closed when the mouth is compressed.

2. A dental injection tube comprising a collapsible body composed of elastic material and adapted to contain a fluid substance, and a reduced nipple at one end thereof provided with a discharge end, the opposite end of the body having a mouth which is normally open and flared to a width greater than that of the body and is normally flattened.

3. A dental injection tube comprising a collapsible body to contain a medicament, and a reduced nipple at one end thereof provided with a flattened discharge end, the opposite end of the body being composed of pliable material and normally open and flared to a diameter greater than the diameter of the body and flattened on the same diameter on which the discharge end of the nipple is flattened.

4. A dental injection tube composed wholly of a non-metallic insoluble pliable substance and comprising a body to contain a fluid substance, a reduced nipple at one end of the body provided with a discharge orifice which is flattened on one diameter of the body, and a normally open but collapsible mouth at the other end of the body, said mouth being flattened on the same diameter on which the discharge orifice of the nipple is flattened and being flared in a direction outwardly and away from the body of the tube.

5. A dental injection tube composed of celluloid and comprising a collapsible body to contain a fluid substance, a reduced nipple at one end of the body provided with a discharge opening, and a mouth at the opposite end of the body which is normally open but collapsible, the mouth being flared around its periphery in a direction outwardly and away from the body of the tube and having a constriction between the periphery of its mouth and the body of the tube which is adapted to be closed by compression of the flared mouth.

In testimony whereof I have hereunto set my hand in presence of two subscribing witnesses.

GARRETT LAYTON GRIER.

Witnesses:
 Wm. C. Smith,
 Paul Poetschke.